Nov. 6, 1951     J. T. POTTER     2,574,283
PREDETERMINED ELECTRONIC COUNTER
Filed March 27, 1946     12 Sheets-Sheet 1
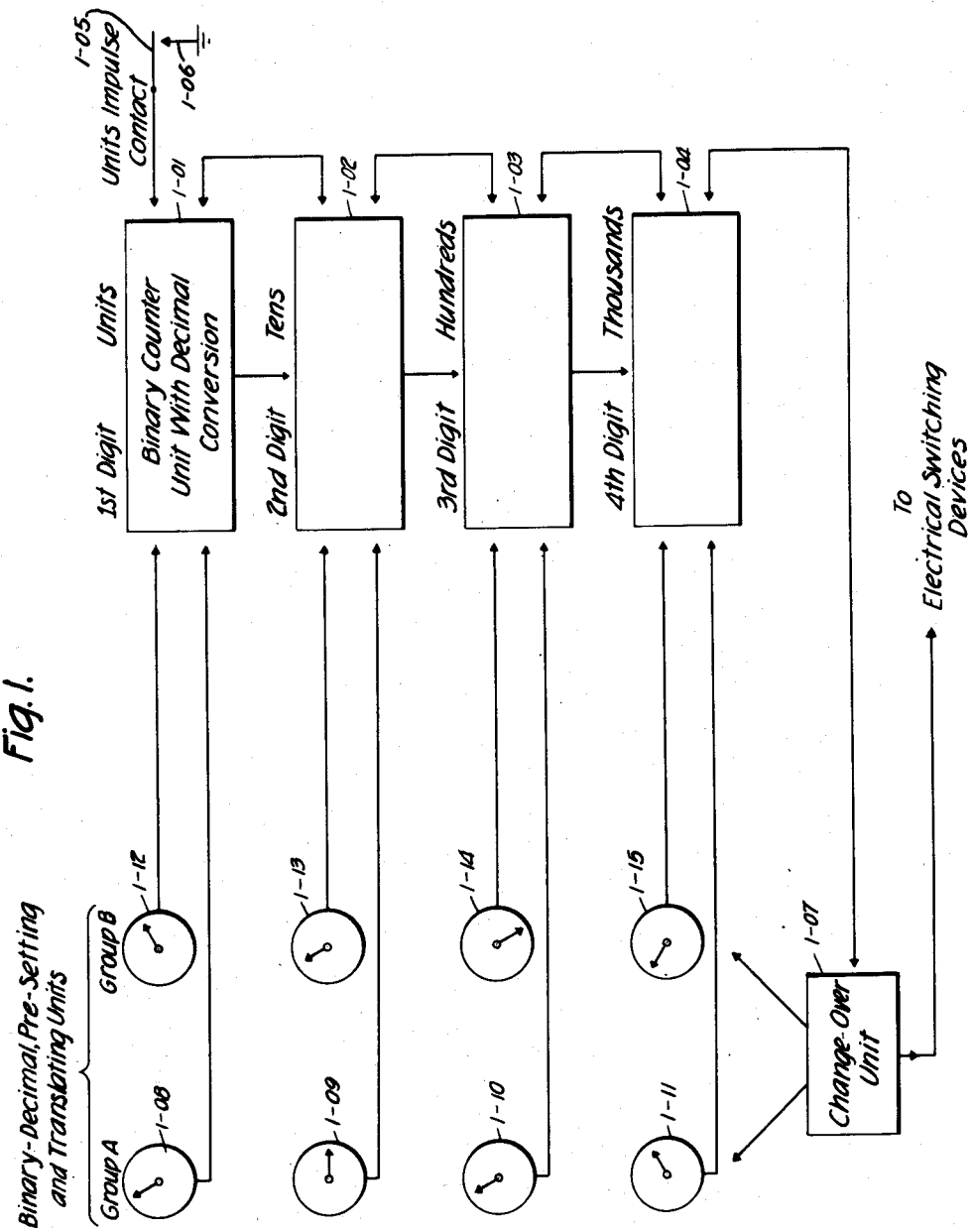
INVENTOR.
John T. Potter
BY Moses, Nolte, Craws + Berry
ATTORNEYS Nov. 6, 1951  J. T. POTTER  2,574,283
PREDETERMINED ELECTRONIC COUNTER
Filed March 27, 1946  12 Sheets-Sheet 2
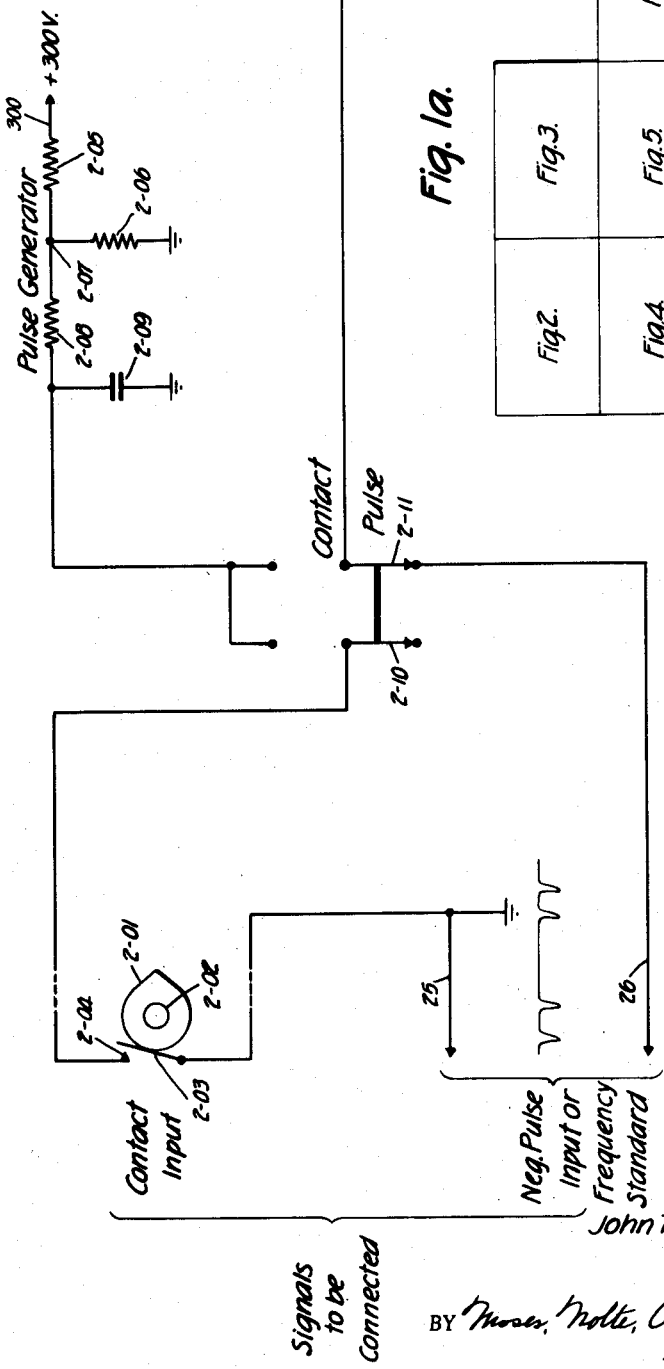
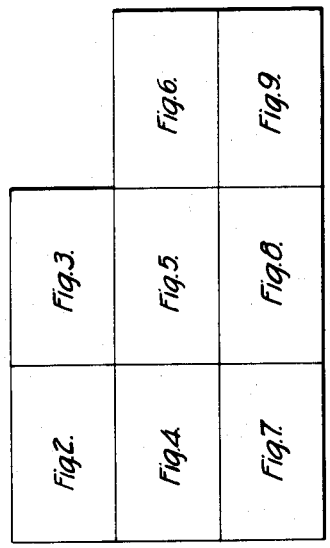
INVENTOR.
John T. Potter
BY Moses, Nolte, Crews & Berry
ATTORNEYS

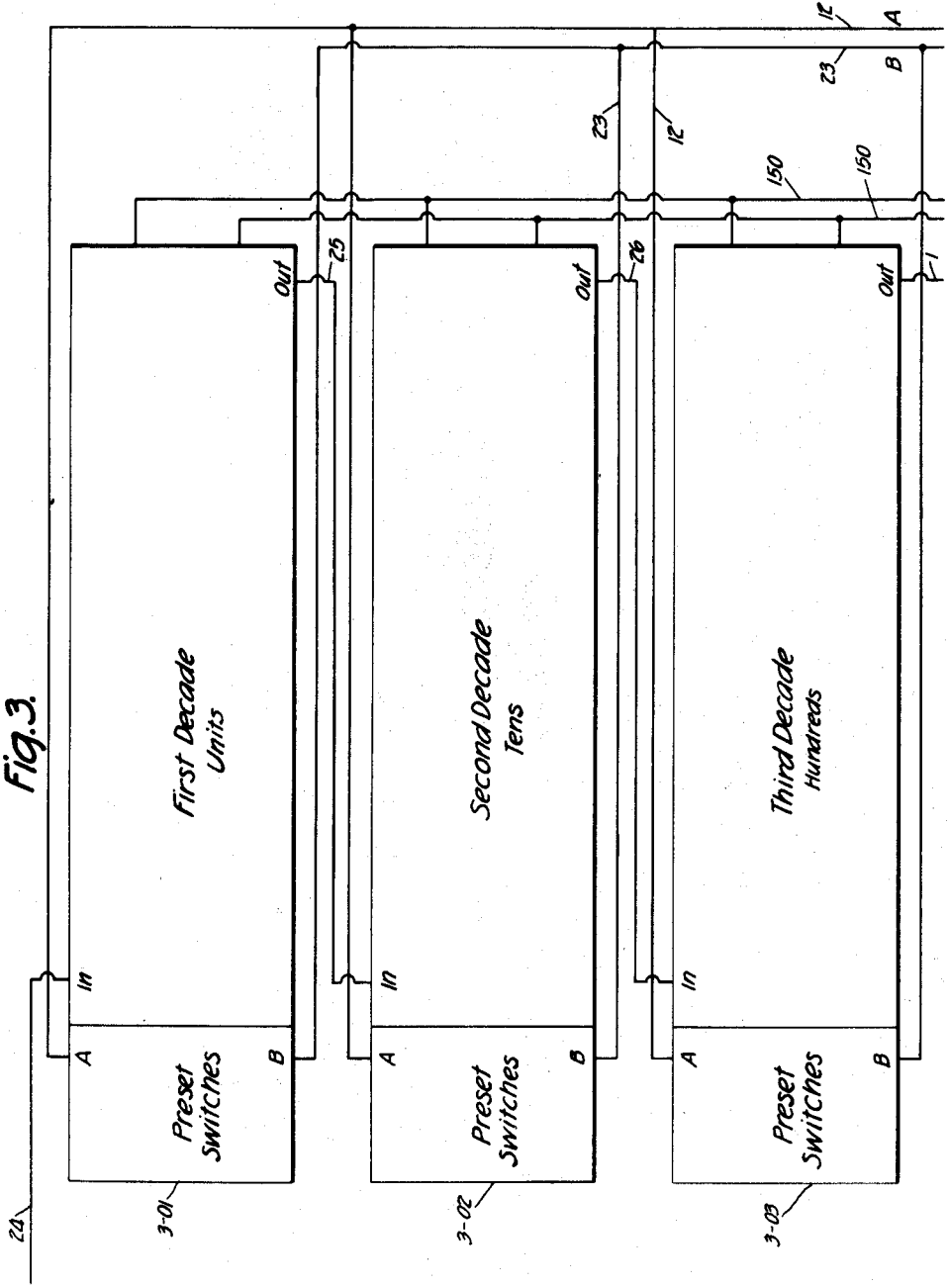

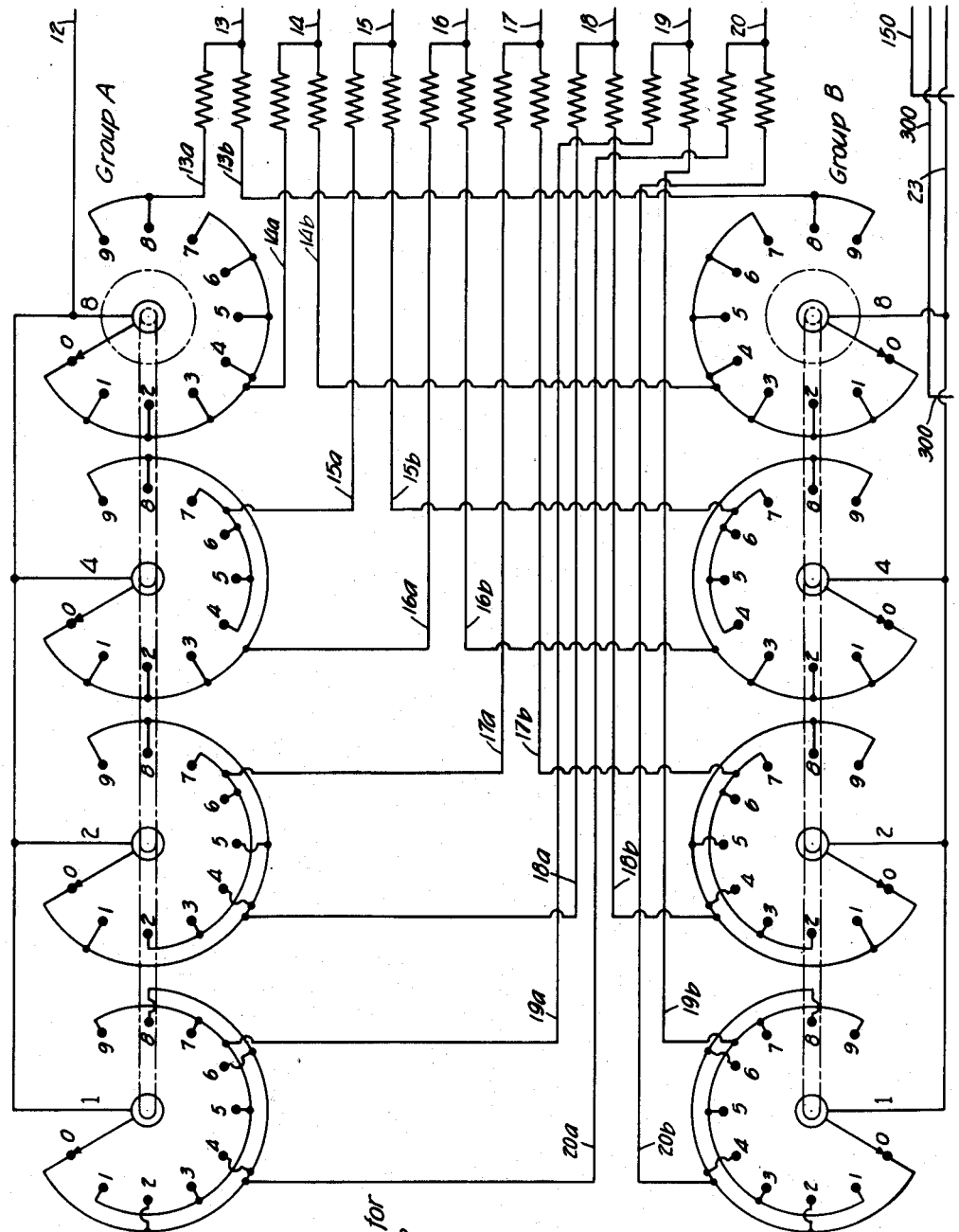

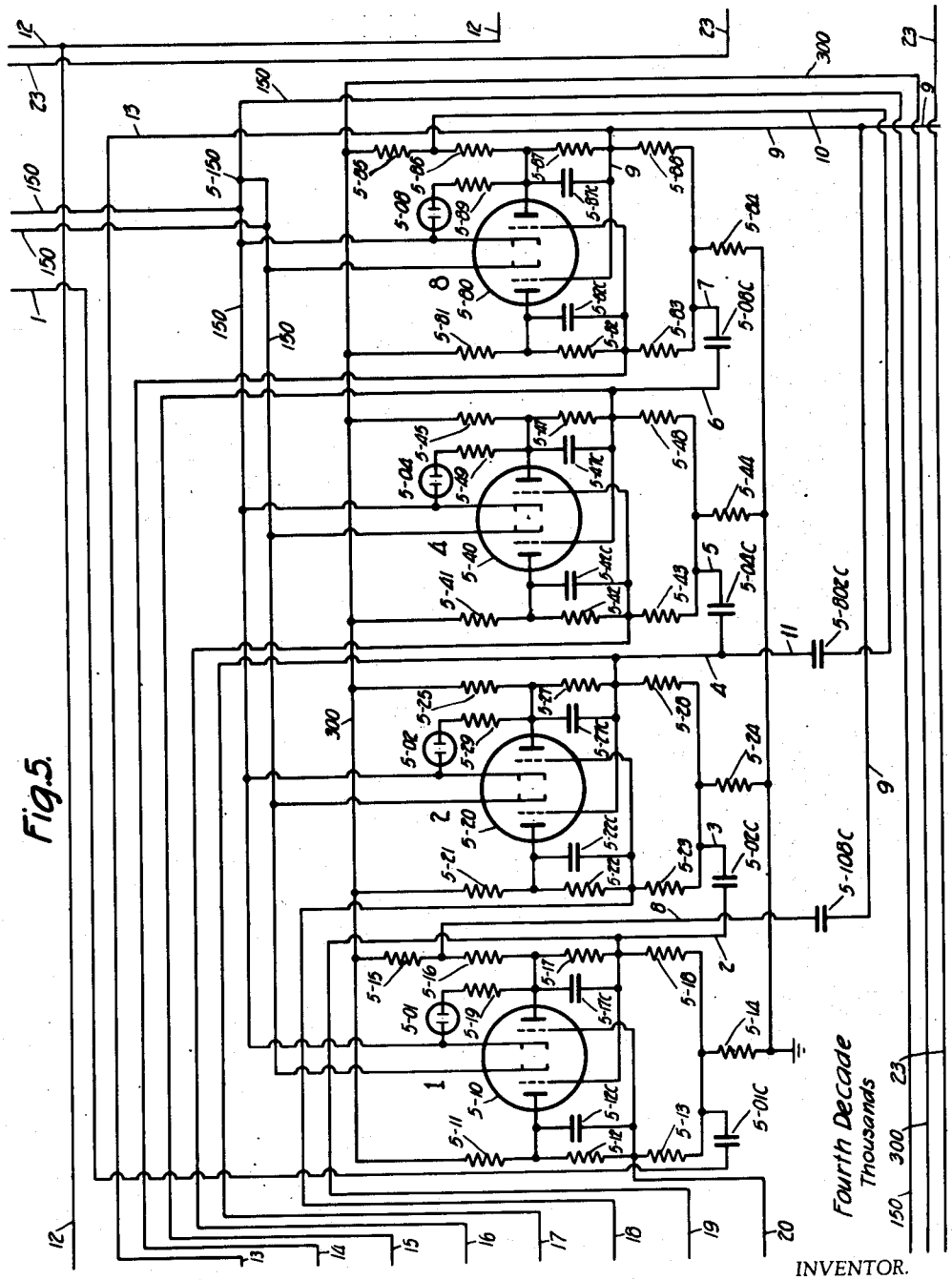

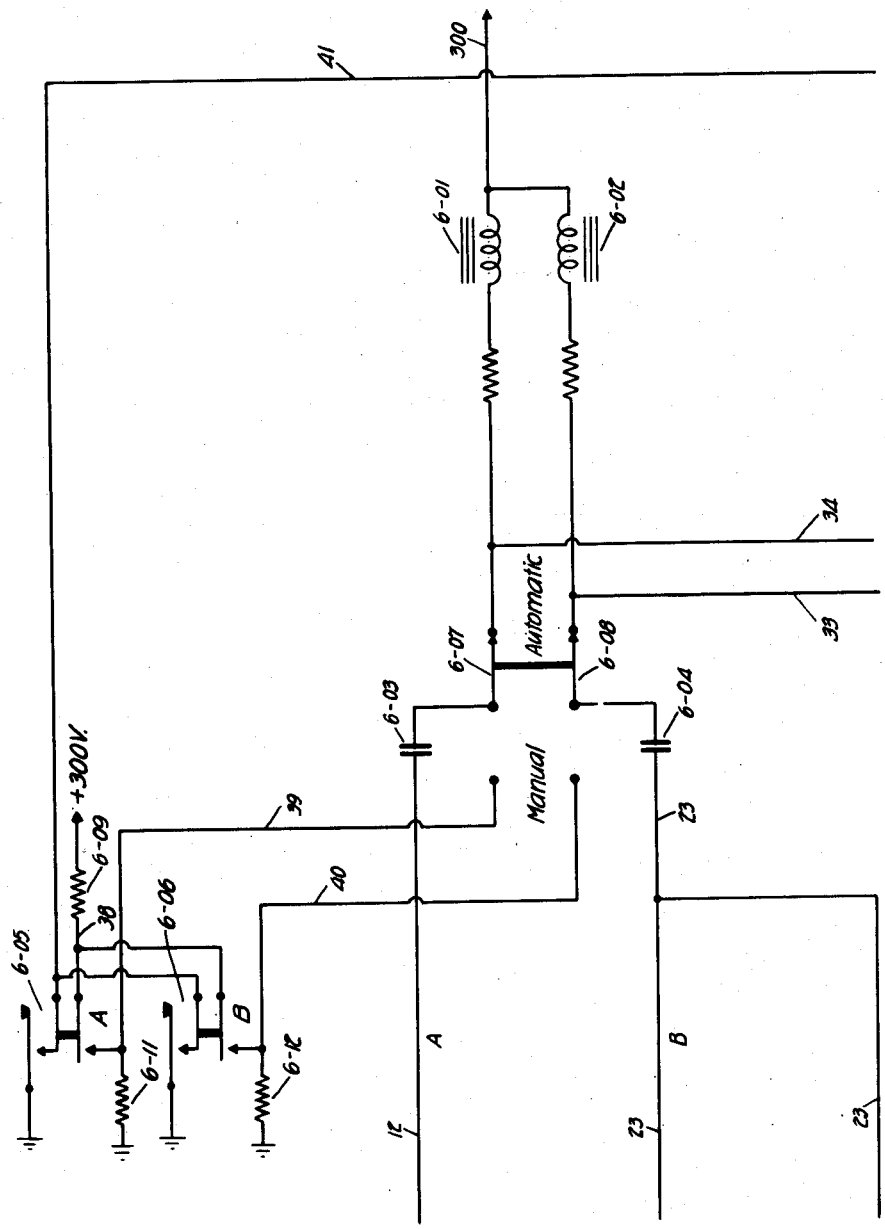

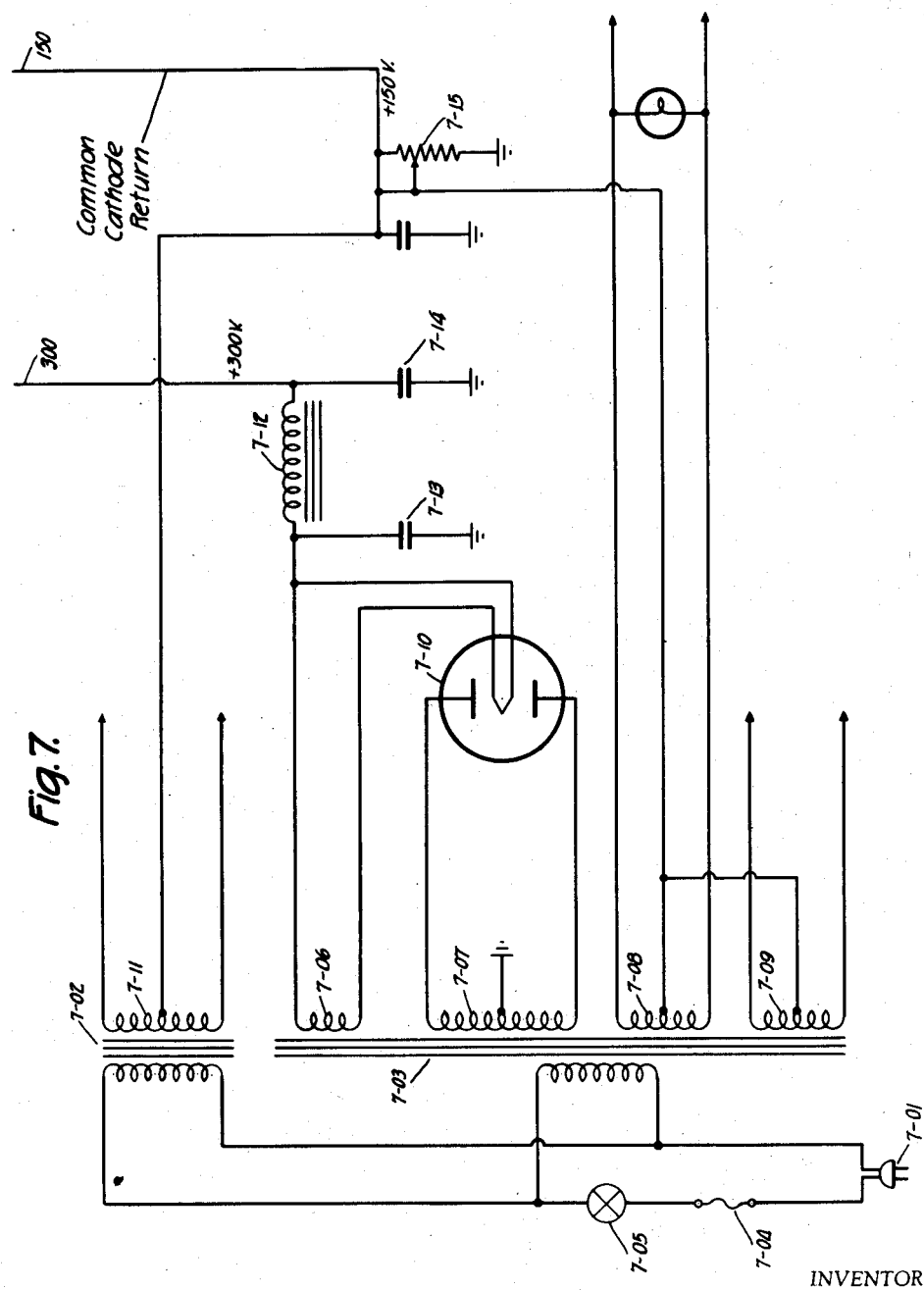

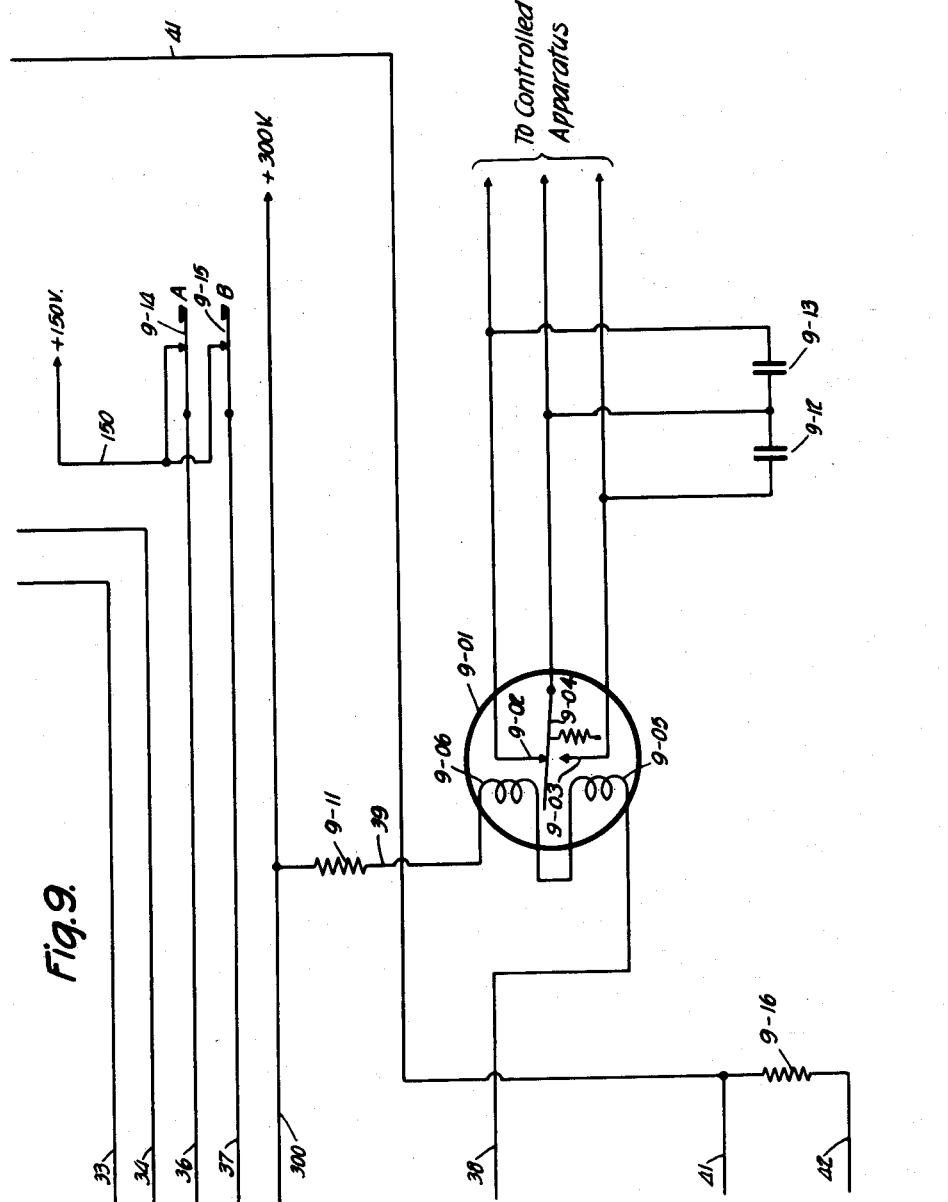

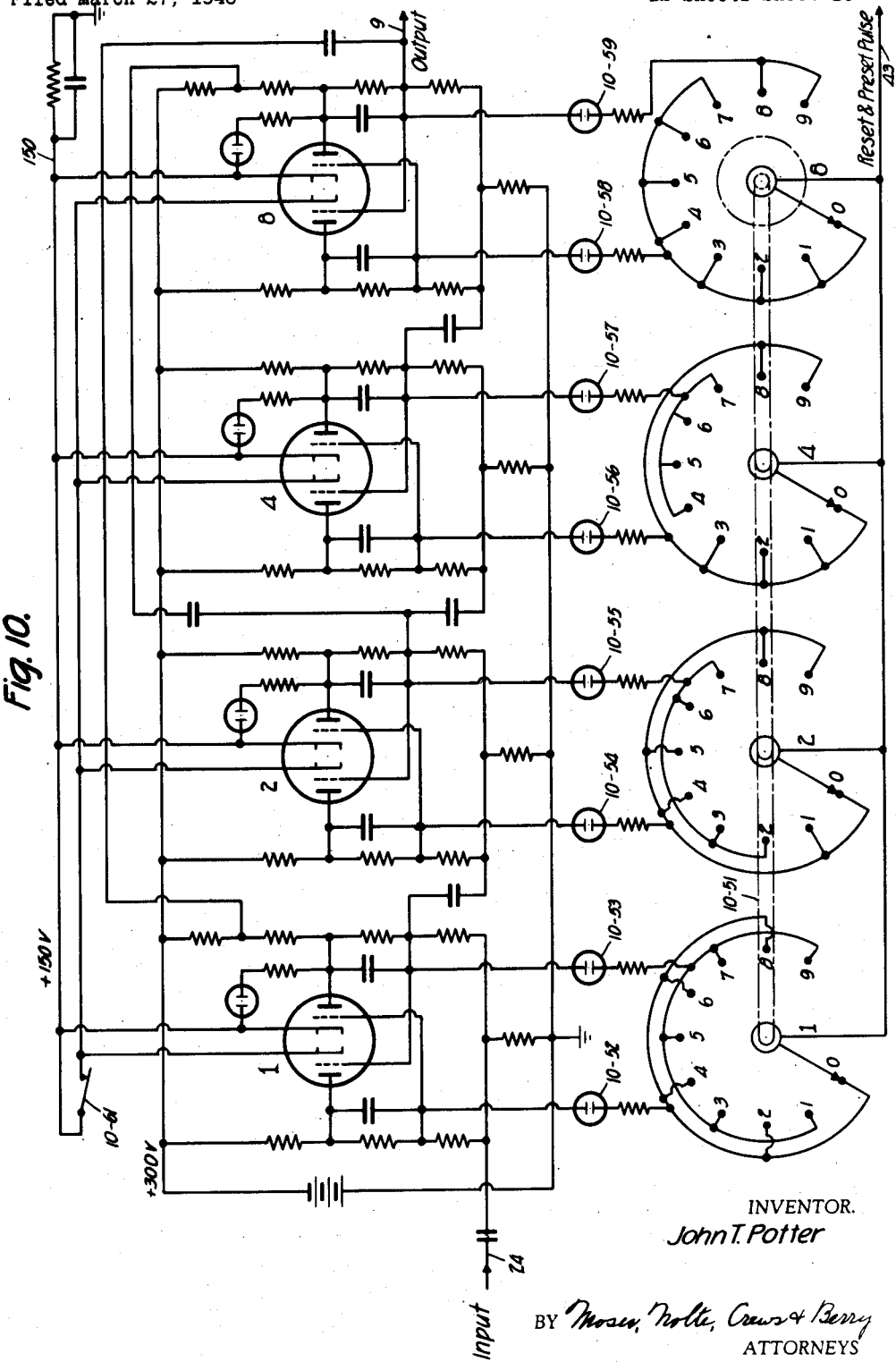

Nov. 6, 1951 J. T. POTTER 2,574,283
PREDETERMINED ELECTRONIC COUNTER
Filed March 27, 1946 12 Sheets-Sheet 11

INVENTOR.
John T. Potter

BY *Moses, Nolte, Crews & Berry*
ATTORNEYS

Nov. 6, 1951  J. T. POTTER  2,574,283
PREDETERMINED ELECTRONIC COUNTER
Filed March 27, 1946  12 Sheets-Sheet 12

INVENTOR.
John T. Potter

BY *Moses, Nolte, Crews + Berry*
ATTORNEYS

Patented Nov. 6, 1951

2,574,283

UNITED STATES PATENT OFFICE 2,574,283

PREDETERMINED ELECTRONIC COUNTER

John T. Potter, Great Neck, N. Y.

Application March 27, 1946, Serial No. 657,581

11 Claims. (Cl. 235—132)

This invention relates to predetermined counting devices in which space discharge devices are utilized to overcome the limitations in counting speed inherent in counters of the mechanical type, or which use moving mechanical parts.

This application is a continuation in part of my co-pending application, Serial No. 510,229, filed November 13, 1943, now Patent No. 2,538,122, issued January 16, 1951.

Any integer can be expressed as a series, as follows:

$$a_0(b)^0 + a_1(b)^1 + a_2(b)^2 + a_3(b)^3 + \ldots a_n(b)^n$$

where $b$ is the base of the system of numbers and the various coefficients $a_0$, $a_1$, $a_2$ are integers ranging in value from 0 to $(b-1)$ inclusive. In a decimal system, the base $b$ is always written as 10, $b^2$ as 100, $b^3$ as 1000, etc.

In decimal counting we write the terms in the reverse order, $a_n$, $a_{n-1}$, $a_3$, $a_2$, $a_1$, $a_0$, etc., having any integral value in the range from 0 to 9, inclusive.

$$a_n(10)^n + a_{n-1}(10)^{n-1} + \ldots a_3(10)^3 + a_2(10)^2 + a_1(10)^1 + a_0(10)^0$$

furthermore, we omit the + signs and write the coefficients consecutively without additional notation For example 34682

This number means $30000 + 4000 + 600 + 80 + 2$ or $3(10)^4 + 4(10)^3 + 6(10)^2 + 8(10)^1 + 2(10)^0$ In binary counting, 2 is used as a base and hence there can be only two values for any of the coefficients, namely, 0 and 1. This simplicity of coefficients gives unusual practical advantages to the binary system for applications in the field of high-speed counting.

For example: $7 = 1(2)^2 + 1(2)^1 + 1(2)^0$ which would be written as the binary number 111 and $8 = 1(2)^3 + 0(2)^2 + 0(2)^1 + 0(2)^0$ or 1000 in the binary system.

Using the form of notation corresponding to the usual decimal system we have the following conversion table up to four binary digits.

| Decimal System | Binary System |
|---|---|
| 0 | 0 |
| 1 | 1 |
| 2 | 10 |
| 3 | 11 |
| 4 | 100 |
| 5 | 101 |
| 6 | 110 |
| 7 | 111 |
| 8 | 1000 |
| 9 | 1001 |
| 10 | 1010 |
| 11 | 1011 |
| 12 | 1100 |
| 13 | 1101 |
| 14 | 1110 |
| 15 | 1111 |

It is apparent that in order to use the binary system in a decimal counter, four binary digits will be required to cover the range from 0 to 9 which is required in each decimal digit.

The binary numbers in each binary counter capable of producing ten consecutive conditions and hereinafter referred to as a "decade" will be as follows:

| Decimal Number | Binary Number |
|---|---|
| 0 | 0 |
| 1 | 1 |
| 2 | 10 |
| 3 | 11 |
| 4 | 100 |
| 5 | 101 |
| 6 | 110 |
| 7 | 111 |
| 8 | 1000 |
| 9 | 1001 |

Since 9 is the greatest integer in any decimal digit and hence in any decade, the next unit counted must return the binary counter to 0 and advance the next decade by one unit. If zero were not produced, the next binary number would correspond to 10 (decimal) and would be 1010 (binary). Comparison of 9=1001 and 10=1010 shows that zero can be obtained instead of 10 if the third binary digit can be momentarily blocked and prevented from advancing from 0 to 1 and if the first digit can be restored to zero at the same time that the fourth digit changes from 1 to 0. At the same time a control effect must be produced to advance the next decade by one unit. The second binary digit remains at zero in either case and requires no special arrangement. An examination of the binary numbers reveals that each time a binary digit changes from 0 to 1, with successive increments of one unit, none of the other digits is affected. Every time a binary digit changes from 1 to 0, the adjacent binary digit on its left must be changed, either from 0 to 1 or from 1 to 0 as the case may be. This change from 1 to 0 in the binary system is the same type of change as from 9 to 0 in the decimal system.

An object of the invention is to provide a multi-digit decimal counter of the resettable type in which each digit comprises a decade consisting of a four digit binary counter modified to reset to zero in advancing from its ninth to its tenth condition, and in advancing and resetting, causes the advance of the next higher adjacent decade by one unit, this arrangement producing an external control effect whenever all of the binary counters shift together from their ninth to their tenth conditions.

Another object of the invention is to provide a counting device arranged to produce an external effect upon reaching an adjustable predetermined count and in which the count is registered in a group of individual counters operating with a low numerical base such as 2, each individual counter having a certain maximum capacity. Upon reaching this maximum, any individual counter will reset itself to zero at the same time advancing the next counter by one unit, the external effect being produced as the several counters reset simultaneously, or when they register some other specific combination of conditions corresponding to the predetermined count. At the same time as the desired external effect is produced and before the registration of the next unit to be counted, a presetting action takes place which action is designed to condition the device to start again.

Another object of the invention is to provide a counter in which a predetermined integral initial number can be instantaneously impressed and retained in the counter, after which initial number the apparatus will count to a fixed maximum count consisting entirely of nines, automatically resetting itself to zero at the next count after it has reached this inherent maximum count, the resetting being accompanied by another pre-setting and by an external control effect.

Instead of nines, some other number may be selected to produce a corresponding effect, if desired. The particular number selected will depend, of course, upon a variety of factors such as facility in setting and reading the count registered, which makes nines desirable, and providing the maximum possible counting capacity with a minimum of apparatus which would make 15 or 31 preferable to nines in the case of a binary system.

A further object of the invention is to provide a counting device in which any desired predetermined number of impulses may be independently selected on a plurality of setting devices, after which the mechanism will, after reaching the predetermined number of impulses determined by one of the setting devices, shift without appreciable delay and count up to the predetermined number of impulses set on one of the others of the presetting devices. If there are only two such pre-set numbers, the numbers will be counted alternately. If there are more than two such pre-set numbers, the device will proceed in rotation to count up to the predetermined number of impulses selected in each group of setting devices, and after having completed the predetermined count established in each group, it will start again at the point of the beginning.

Another object of the invention is to provide a device suitable for high speed remote selection and switching of circuits where relays, selector switches, and similar apparatus are presently utilized. The present invention will permit impulses to be transmitted at rates of the order of 1000 impulses per second, and will register them at the same rate upon receipt at the remote end of the circuit. The predetermined counting feature of the invention may be utilized to transmit a specific number of pulses at unusually high pulsing frequency, and may be arranged to transmit them in groups with such spacing between groups as may be desirable for the purpose.

A further object of the invention is to provide a binary counter including a self-contained binary-decimal translating device with facilities for instantaneously establishing a predetermined initial count prior to the reception of the impulses to be counted.

From another aspect the invention includes a counter of the binary type which operates exclusively on multiples of two, with self-contained resetting provisions which cause it to reset itself each time a count of ten has been reached, and with additional facilities for presetting any desired integer into the counting device before the reception of any of the impulses to be counted. This preset integer will cause the device to reach the maximum count of ten by a lesser number of impulses as determined by the pre-inserted fixed count.

Another object of the invention is to provide a timing device having pre-set intervals, and by deriving the impulses to be counted from a frequency standard of great precision such as a quartz crystal, to obtain a corresponding precision in the timing of the intervals. Because a counting device of the type contemplated by the invention will accurately register impulses at rates of the order of 1000 per second and higher, intervals may be timed to the nearest milli-second or even smaller unit of time.

The invention further makes provisions for the interconnection of a plurality of substantially identical individual digit counters in the usual decimal arrangement, with facilities for pre-establishing in each of the digits any desired number, thereby causing the several digits to reach their maximum count at any desired number of impulses, this number constituting the arithmetic difference between the pre-established number and one unit more than the maximum number which can be accommodated by the several digits.

A further object of the invention is to provide a counting device having a single counting channel, and at least two presetting channels; the device being arranged to count to the maximum count set in one of the said presetting channels and immediately thereafter start counting to the maximum count set in the next of the presetting channels and after having counted to the maximum count in each of all of the presetting channels will thereafter immediately begin counting to the maximum count set in the first presetting channel, the counting being accomplished without the use of moving mechanical parts, thus avoiding the limitations in counting speed inherent in the use of mechanical devices.

Other and further objects will become apparent upon reading the specification.

Referring to the drawings, Fig. 1 is a simplified diagrammatic illustration of Figs. 2 to 9 showing two preselecting units associated with a four digit counting device;

Fig. 1a illustrates the relative arrangements of the positions of Figures 2 to 9 in order to facilitate tracing the interconnecting leads;

Figs. 2 to 9 constitute a single schematic drawing showing the invention applied to a four digit counter having two presetting devices. Each figure shows a portion of the entire circuit;

Fig. 2 illustrates that portion which includes a pulse generating device and the input circuit to the counter;

Fig. 3 shows the interconnections among the first three decades of the four digit counting device of Figs. 2 to 9;

Fig. 4 illustrates a portion of the circuit including the connections of the presetting switches associated with the 4th decade, these being identical with those of the first three decades;

Fig. 5 shows a part of the circuit including the electrical connections within the binary-decimal counting unit of the fourth decide, these being identical with those of the first three decades;

Fig. 6 is a portion of the circuit including some of the resetting arrangements;

Fig. 7 is a portion of the circuit of Figs. 2 to 9 showing the power supply for the device;

Fig. 9 shows another portion of the resetting arrangements including a high-speed control relay for switching in accordance with whichever of the two predetermined counts of Figs. 2 to 9 is in operation;

Fig. 10 shows a modification comprising a single digit unit having only one predetermined count setting device;

Figs. 11 to 16 show a variety of optional arrangements for presetting a predetermined initial count and for resetting the count to zero.

Figure 8:
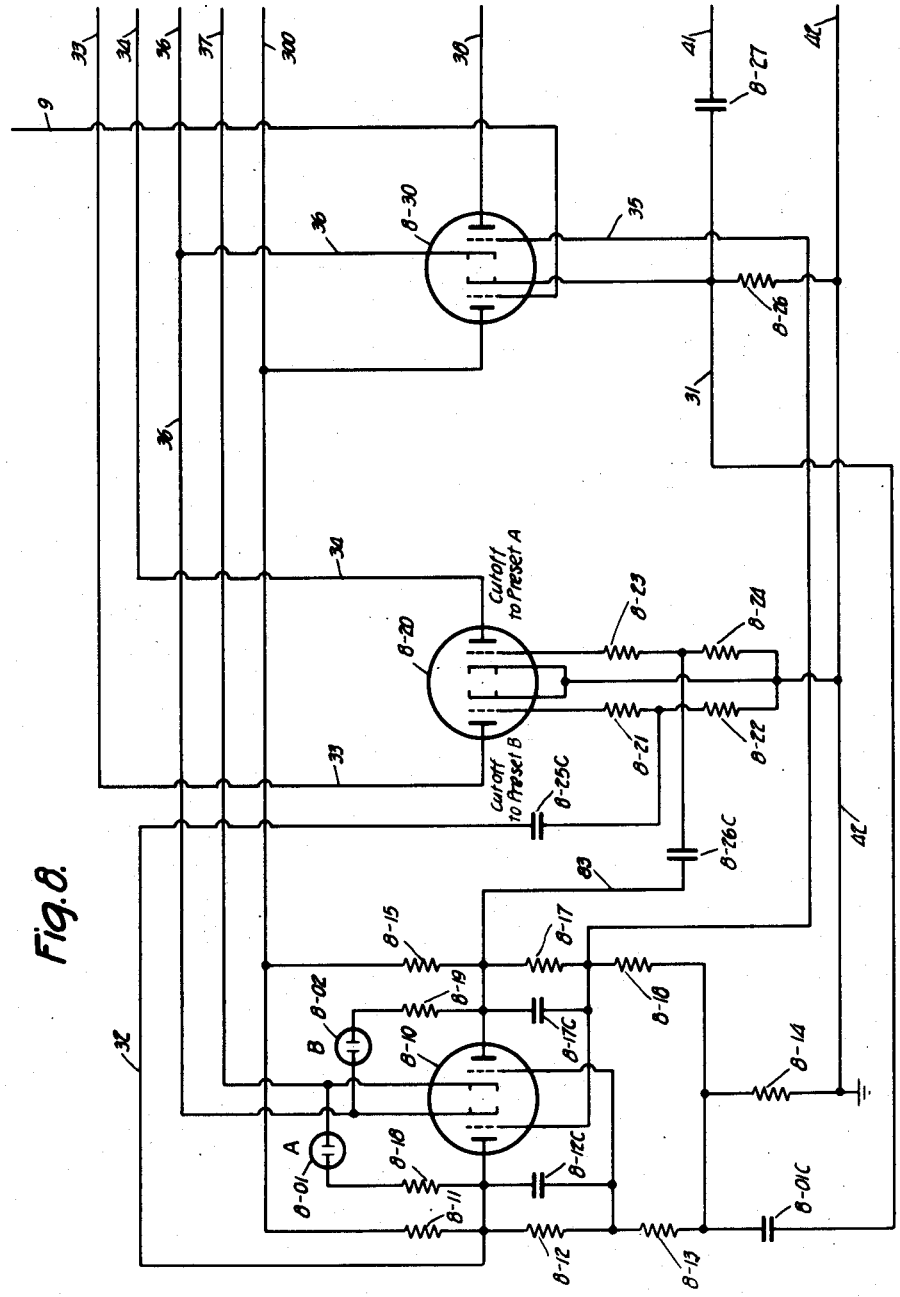
Fig. 8 illustrates a portion of the circuit including part of the switch-over arrangement for alternating between one and the other of the two sets of predetermined counts shown in Figs. 2 to 9.

Referring to Fig. 1, 1—01, 1—02, 1—03 and 1—04 are binary counting chains with inherent decimal conversion arrangements so that upon reaching a count of ten in any of the digits, the next impulse will be transmitted to the next succeeding digit. When all four of the digits have reached a count of nine, the next succeeding impulse will be transmitted through all four digits and into the change-over unit 1—07. The impulses are illustrated as being derived from a pair of mechanically actuated contacts 1—05 and 1—06 but any other suitable source of pulses may be utilized. For interval timing the pulses are derived from a frequency standard or other source of suitable accuracy. The predetermined initial count is established by setting the dials of Group A comprising the individual digit setting units 1—08, 1—09, 1—10, 1—11, to the particular setting desired. Upon receiving an impulse from the change-over unit 1—07, the particular initial setting on each digit will be immediately established in the respective counters 1—01, to 1—04. The remaining number of impulses will be determined by the difference between the settings of the Group A switches 1—08 to 1—11 and the maximum count of four digits which is 10,000.

The maximum count impulse which changes from 9,999 to 10,000 will shift the change-over unit and cause it to insert into units 1—01 to 1—04 the respective initial counts determined by the settings of the switches of Group B, 1—12 to 1—15. The device will then again begin counting up to the maximum. After registering the necessary number of impulses to carry from the initial setting determined by the switches of Group B up to 9,999, the next succeeding impulse will pass through the four individual digit counter units resetting them to zero and will simultaneously cause the change-over unit 1—07 to revert to Group A.

Referring to Fig. 2 a cam 2—01 is mounted on a revolving shaft 2—02. Movable contact 2—03 is held in yielding engagement with cam 2—01 and the shape of cam 2—01 causes movable contact 2—03 periodically to engage stationary contact 2—04. A portion of the positive power supply for the device is taken from conductor 300 and is connected through a resistance network comprising resistors 2—05 and 2—06. The portion of the total potential appearing at junction 2—07 is applied through resistor 2—08 to capacitor 2—09. With the switch blades 2—10 and 2—11 in their upper position, a periodic closing of contacts 2—03 and 2—04 will discharge capacitor 2—09 at intervals in accordance with the revolutions of shaft 2—02. Each closure of contacts 2—03 and 2—04 discharges the capacitor 2—09, sending a negative impulse along conductor 24. This negative impulse has a relatively steep wave front produced by the sudden discharge of capacitor 2—09. When the contacts 2—03, 2—04 open, the capacitor 2—09 charges at a reduced rate through resistor 2—08 and a positive pulse of more gradual wave front proceeds along conductor 24. With switch blades 2—10, 2—11 in their lower position, as indicated in Fig. 2, the conductors 25 and 26 are intended to be connected to a source of negative pulses, each negative pulse representing a unit of the number to be counted. The device for producing these negative pulses is not shown, but it may be the output of an amplifier associated with a photoelectric system or any other suitable arrangement. In timing applications, the source will be the output of an oscillator having suitable wave shape and frequency precision and stability characteristics. It is important to note that the spacing need not be uniform except for interval timing. The negative pulses applied to conductor 24 proceed from Fig. 2 to Fig. 3, and to the input terminal of the first, or units decade.

In Fig. 3 the interconnections of three of the four substantially identical decade units are shown. When an impulse is received in the first, or units decade which causes it to change from 9 to 10, this impulse is transmitted to its output lead 25 which is in turn connected to the input of the second or tens decade. The output of the second decade is in turn connected through conductor 26 to the input of the third or hundreds decade and the output third decade is similarly connected to conductor 1 which extends to Fig. 5. If all of the first three decades of Fig. 3 are each in the condition corresponding to the registration of a count of 9, the next succeeding impulse will be transmitted through all three and into the input of the fourth or thousands decade of Fig. 5 this impulse passing along conductor 1.

Fig. 5 shows the internal circuit arrangements of the fourth counting decade. This decade is identical with the other three decades 3—01, 3—02 and 3—03 of Fig. 3 and their internal circuits are therefore not shown. Each of these decades will count up to 10. The 10th pulse received by any decade will restore the decade to its zero condition, making the 10th impulse equivalent to zero. The 10th impulse will also be simultaneously passed on through the decade via its output terminal to the next succeeding decade or to such other circuit as may be connected to the output terminal.

Referring to Fig. 5, each decade comprises four double triodes 5—10, 5—20, 5—40 and 5—80 connected as cascaded trigger circuits. Associated with each of these triodes is a neon indicator 5—01, 5—02, 5—04 and 5—08, respectively. Each neon indicator is connected across the right hand anode-cathode circuit of its associated double triode, through one of the resistors 5—19, 5—29, 5—49 and 5—89, respectively. The anode supply voltage from conductor 300, flows through a group of resistance networks to ground. Associated with the left hand side of each of the double triodes is a group of three resistors. These are 5—11, 5—12, 5—13, in the case of double triode 5—10. Resistors 5—21, 5—22 and 5—23, are similarly associated with tube 5—20; 5—41, 5—42 and 5—43, with tube 5—40; and 5—81, 5—82 and 5—83, with tube 5—80. Each of these groups of resistors, is connected to ground through a resistor common to conjugate resistors associated with the right hand side of each tube. These common resistors are 5—14, 5—24, 5—44 and 5—84 respectively. In the case of tubes 5—20, 5—40, the corresponding conjugate resistance network for the right hand side consists of resistors 5—25, 5—27 and 5—28, 5—41, 5—47 and 5—48 respectively. In the case of tubes 5—10 and 5—80, the resistance intermediate the anode supply conductor 300 and anode, is divided into two components 5—15 and 5—16 in the case of tube 5—10, and 5—85 and 5—86 in the case of tube 5—80. The remaining resistors 5—17, 5—18, 5—87 and 5—88 are connected in the same manner as the other tubes. As explained later, certain blocking and resetting impulses are taken from the junction point between 5—15 and 5—16, and the junction point between 5—85 and 5—86. All the cathodes are connected to the conductor 150. Although this conductor is shown as consisting of two conductors, they are joined at the junction point 5—150 and under certain optional circuit arrangements to be discussed later in connection with Fig. 13, this junction point may be omitted and the left hand cathodes and right hand cathodes supplied by individual conductors. The resistors 5—12, 5—22, 5—42 and 5—82 are bridged respectively by the capacitors 5—12C, 5—22C, 5—42C and 5—82C. Similarly, the resistors 5—17, 5—27, 5—47 and 5—87 are bridged by the capacitors 5—17C, 5—27C, 5—47C and 5—87C.

The impulse receiving input for each of the double triodes is through a capacitor to the ungrounded side of the common resistor. In the case of tube 5—10 this is through capacitor 5—01C to the ungrounded side of resistor 5—14. Similarly, for 5—20, 5—40 and 5—80, the input will be through capacitor 5—02C, 5—04C and 5—08C to the ungrounded sides of resistors 5—24, 5—44 and 5—84 respectively. Capacitor 5—802C is located in an actuation preventing circuit between tubes 5—80 and 5—20 and capacitor 5—108-C is included in a resetting circuit between tubes 5—10 and 5—80. The actuation-preventing circuit and the resetting circuit operate in conjunction with the 10th impulse as described below.

In operation, double triode 5—10 has its left hand anode connected from supply conductor 300, through resistor 5—11. A part of the current produced by this positive potential continues through a series of resistors 5—12, 5—13, and the common resistor 5—14 to ground potential.

On the right hand side of double triode 5—10 there is a corresponding series of resistors 5—15, 5—16, 5—17 and 5—18, joining to the common resistor 5—14. The resistance values of both sides are so arranged that when plate current flows in the left hand side of double triode 5—10, the potential drop across resistor 5—11 will produce a bias which is applied to the right hand grid of tube 5—10 and renders it sufficiently negative with respect to its cathode to produce substantial cut-off of plate current in the right hand side of 5—10. Conversely, when plate current flows in the right hand side of double triode 5—10, the potential drop across resistors 5—15, 5—16 will be sufficient to produce a correspondingly more negative potential at the left hand grid with respect to its cathode and of a magnitude which will likewise produce substantial plate current cut-off. Thus there are only two conditions of stability in double triode 5—10, namely, with current flowing in the left hand side or current flowing in the right hand side. These two conditions correspond to the two coefficients of a binary number system, namely, 0 and 1. With either side conducting, the grid of the opposite side is biased to cut-off. The cathodes of double triode 5—10 are connected to lead 150 which is a common cathode return for all the similar tubes in the system and which returns to ground through arrangements which will be described later, these being so adjusted, that a positive potential with respect to ground of approximately half the anode potential will be maintained on all of the corresponding cathodes of the system.

5—10 designates a neon lamp which is connected in series with resistor 5—19, the series combination being bridged across the anode and cathode of the right hand side of double triode 5—10. This lamp is lighted to indicate the binary coefficient 1 and extinguished to indicate zero. The circuit constants are such that when the right hand side of double triode 5—10 is non-conducting (and therefore the left hand side is conducting) for the condition of binary coefficient 1, the potential difference between anode and cathode on the non-conducting side will be sufficient to cause a glow in the indicator 5—01. Initially, at zero condition, and without the insertion of any predetermined count, the right hand sides of all the double triodes 5—10, 5—20, 5—40 and 5—80 are in a conductive state and, therefore, there is insufficient voltage across any of their respective anode-cathode circuits to cause any of the neon indicators to glow.

The reason for the fact that the right-hand sides of the triodes are initially conductive is that either (a) when the presetting switches are set at zero, then a reset or preset pulse will be applied to the grid of the right-hand element of the triode, and cause it to conduct, or (b) the trigger tubes may be manually reset with the switch 10—61 (Fig. 10) shown in the cathode bus of the tubes.

Considering the double triode 5—10, the first negative impulse entering on lead 1 will pass through capacitor 5—01-C and be applied across the common grid return resistor 5—14. The magnitude and duration of this pulse will be such that it will render both grids of double triode 5—10 momentarily negative with respect to their cathodes. At zero condition, the right hand side was in a conductive state. The left hand grid was biased to cut off. Additional negative bias applied to the left hand grid can have no effect on the plate current of the left hand side since this was substantially zero to begin with.

On the right hand side, however, a sudden negative bias will cut off the flow of plate current in the right hand side. This will be accompanied by a rapidly increasing positive potential at the right hand plate of 5—10, and this will evidence itself as a positive pulse passing through capacitor 5—17-C directly to the left hand grid. This positive pulse is accompanied by a rearrangement of the potential drops in the resistors 5—15, 5—16, 5—17 and 5—18 such that the left hand grid will receive a permanent potential tending to make the left hand side conductive. This causes a shift from the zero condition of stability to the actuated condition of stability corresponding to binary coefficient 1, and the left hand side of double triode 5—10 will proceed to become conductive and the right hand side will correspondingly become non-conductive. With the right hand side non-conductive, its anode-cathode potential difference will increase to a value where the neon indicator 5—01 will glow showing that the tube 5—10 has been actuated. In considering the next stage comprising double triode 5—20, it will be noted that a coupling condenser 5—02C is connected via conductors 2 and 3 between the left grid at the right hand or output portion of the circuit of double triode 5—10 and the negative pulse input portion in the circuit associated with double triode 5—20. Thus whenever a negative pulse is impressed upon capacitor 5—02C, response of double triode 5—20 will take place.

As previously described, the action of shifting from one condition of stability to the conjugate condition of stability, can be produced by momentarily creating cut-off conditions or a marked reduction in plate current in the conducting side of the tube whichever side that may be. The other side being already cut-off, naturally cannot respond to a negative impulse. Whenever the right hand side of triode 5—10 is subjected to a change making it conductive (corresponding to a change from 1 to 0) its right hand plate immediately becomes less positive and, therefore, a negative impulse is impressed through conductor 2, condenser 5—02C and conductor 3 to the input of double triode 5—20, causing it to shift from whichever condition of stability it may have previously had, to the conjugate condition of stability. When the right hand side of triode 5—10 undergoes a change to make it become non-conducting (corresponding to the change from 0 to 1), its plate becomes more positive and a positive pulse will follow along conductor 2, capacitor 5—02C and conductor 3 to the input of double triode 5—20.

The positive pulse, depending upon the particular tube characteristics and circuit constants, will either be dissipated by drawing grid current in the conducting side of tube 5—20 or will increase the plate current in the conducting side of tube 5—20 causing an offsetting negative impulse to be applied through one of the cross-coupling capacitors 5—22C or 5—27C to the negatively biased grid of the non-conducting side together with an increase in this negative bias or a combination of both these effects may be produced. In any event, the positive pulse will not shift the condition of stability of tube 5—20.

In this manner, each negative pulse arriving at the input of double triode 5—10, causes it to shift its condition of stability. Each time a shift in condition of stability is in the drection corresponding to a change from binary coefficient 1 to binary coefficient 0, the right hand anode suddenly becomes less positive, producing a negative pulse. This negative impulse flows along conductor 2, capacitor 5—02C and conductor 3 to the corresponding input terminal for double triode 5—20, as described, causing double triode 5—20 almost simultaneously to shift from its zero condition of stability or vice versa.

A corresponding connection is provided through a conductor 4, condenser 5—04C and conductor 5 to the input of double triode 5—40, and again a similar connection is provided by conductor 6, condenser 5—08C and conductor 7 to the input of double triode 5—80. Alternate impulses in each triode will render the right hand side conductive. These alternate impulses which render the right hand side conductive and which correspond to a change in binary coefficient from 1 to 0, will cause a shift in the condition of next succeeding double triode. Thus, every fourth impulse over conductor 1 will simultaneously cause the right hand sides of both double triodes 5—10 and 5—20 to be conductive and therefore shift the condition of double triode 5—40, in accordance with the table of binary numbers above.

Every eighth impulse will, therefore, shift the condition of stability of all double triodes including 5—80.

The following are the consecutive conditions of the decade. Initially, under zero conditions, the right hand sides of all the triodes are conductive. The first impulse causes the left hand side of double triode 5—10 to become conductive and its right hand side to become correspondingly non-conductive, and its associated neon indicator 5—01 to glow, indicating the actuated condition. This is accompanied by a positive impulse from condenser 5—02C along conductor 3 to the input of double triode 5—20. This positive impulse has no effect upon the condition of stability of 5—20.

The second impulse causes 5—10 to revert to its initial condition with its right hand side conductive and its neon indicator 5—01 extinguished. This shift is accompanied by rapid decrease in positive potential at the anode of the right hand side of 5—10, producing a negative impulse which in turn passes through condenser 5—02C to the input of double triode 5—20, thereby shifting its condition of stability from zero so that its left hand side will now become conductive and its right hand side become non-conductive. Upon becoming non-conductive in its right hand side, its associated neon indicator 5—02 will glow and a positive impulse will proceed along conductor 4 through capacitor 5—04C and conductor 5 to the input circuit of double triode 5—40. As previously explained, this positive impulse would have no effect upon the condition of stability of double triode 5—40.

The third impulse will cause double triode 5—10 to shift its condition of stability again from zero to actuated so that its left hand side will now become conductive. It is now apparent that each odd numbered impulse will actuate 5—10 and each even numbered impulse will restore it to zero. Each odd numbered impulse in rendering the right hand side of 5—10 non-conductive, will cause lighting of its associated neon indicator 5—01, to indicate its actuated condition.

The fourth impulse being an even numbered impulse, will again render the right hand side of double triode 5—10 conductive, restoring it to zero and initiating a negative impulse through capacitor 5—02C, and at the same time extinguishing neon indicator 5—01. This negative impulse will cause a shift in double triode 5—20 restoring it to zero so that its right hand side will likewise now become conductive and in turn will pass a negative impulse along through capacitor 5—04C to the input of double triode 5—40. The right hand side of double triode 5—40 will now become non-conductive upon actuation, lighting its associated neon indicator 5—04.

This sequence of the first three impulses will be repeated and will proceed in accordance with the table of binary numbers above, until the eighth impulse, upon which 5—10, 5—20, 5—40 will all be restored to their respective zero conditions substantially simultaneously and 5—80 will be shifted to its actuated condition for the first time, its right hand side will become non-conducting and its left hand side conducting.

In order to make provision for conversion from binary to decimal counting, provision is made to restore the entire group of four double triodes to their zero conditions upon receipt of the tenth impulse from conductor 1. In order to accomplish this, in the course of the tenth impulse, 5—20 is prevented from changing from its zero condition of stability since it is already in its zero condition. Tube 5—80 must be reset to zero at the same time.

Circuit arrangements are provided as follows to furnish 5—20 with a preventive pulse and 5—80 with a resetting pulse, both of these pulses being produced by and concurrently with the tenth impulse.

Upon receipt of the ninth impulse, the right hand side of 5—10 becomes non-conducting and a positive impulse flows along conductor 8, condenser 5—108C and conductor 9 and is impressed upon the left hand grid of double triode 5—80. This positive impulse is created by the production of an actuated condition in tube 5—10, that is with the right hand side non-conducting, causing indicator 5—01 to glow. This is accompanied by an increase in anode potential and corresponding increased positive potential in conductor 8. This positive impulse flows through condenser 5—108C to the left hand grid of double triode 5—80. Since the left hand side of 5—80 is already conducting, this actuation having occurred upon receipt of the 8th impulse, the 9th impulse has no effect upon its actuated condition nor has it any effect on 5—20 because, as previously explained, only even numbered impulses transmit negative impulses through the condenser 5—02C through the input of double triode 5—20.

Upon receipt of the 10th impulse, the right hand side of double triode 5—10 becomes conducting, thus restoring it to zero. Double triode 5—40 was previously restored to zero upon receipt of the 8th impulse which shifted double triode 5—80 to its actuated condition.

A resetting impulse for 5—80 is derived across resistor 5—15 and is transmitted along conductor 8, condenser 5—108C and conductor 9 to the left hand grid of double triode 5—80.

The left hand side of double triode 5—80 was rendered conducting upon actuation accompanying the 8th impulse. Its left grid now being at a sufficiently positive potential with respect to its cathode, 5—80 is susceptible of control by negative impulses applied to its left grid. This negative impulse biases the left hand side of 5—80 to a value at or near cut off causing the right hand side to become conductive and restoring 5—80 to zero. When the right hand side becomes conductive upon restoration to zero, neon indicator 5—08 is extinguished and the sudden increase voltage drop across resistor 5—85 creates another negative impulse which in turn is transmitted along a conductor 10 through condenser 5—802C, conductor 11, and conductor 4 to the left hand grid of double triode 5—20. This impulse arrives substantially simultaneously with the negative impulse along conductor 2 through condenser 5—02C and conductor 3. The negative impulse from the first tube 5—10, tends to cause cut off in both sides of tube 5—20 and since the right hand side was previously conducting in zero condition, the tendency would be to make it shift to the actuated condition by making the left side conductive. The preventive pulse, arriving along conductors 10 and 11, throws an added negative charge on the left grid and prevents this shift to actuated condition from taking place.

It should be noted that the restoring and preventive pulses are of reduced magnitude because they are derived from the change in voltage across only a portion of the total anode resistance, being taken from the junction between resistors 5—15 and 5—16 and the junction between resistors 5—85 and 5—86 respectively. Alternate positive and negative pulses of reduced magnitude are produced at the junction of resistors 5—15 and 5—16 for each impulse counted and are applied through capacitor 5—108C to the left grid of tube 5—80. Except after the 8th impulse the left grid of 5—80 carries a strong negative bias which cannot be overcome by the weak positive pulses and is not affected by weak negative pulses. The weak negative pulse, however, is nevertheless strong enough to shift the condition of stability of tube 5—80 when the left side is conducting.

Likewise, the weak negative preventive pulse produced by resetting tube 5—80 proceeds through capacitor 5—802C where it is applied directly to the left grid of tube 5—20 and thus offsets the normal effect of the stronger negative pulse from tube 5—10 passing through capacitor 5—02C and applied to both grids of tube 5—20 through resistors 5—23 and 5—28, the normal effect of the stronger pulse alone being to shift the right side of tube 5—20 from a conducting to a non-conducting condition. The strong negative pulse which is to be rendered ineffective tends to make the left side of tube 5—20 conducting, the tube being in its zero condition at the time. The weak negative preventive pulse arriving a little later is nevertheless strong enough to provide an increase in negative bias on the left grid sufficient to offset the positive voltage produced by the strong pulse and thus to prevent any shift from taking place.

Thus, on the 10th impulse, a resetting pulse is applied to tube 5—80 and a preventive pulse is applied to tube 5—20. The 10th pulse being an even numbered pulse is inherently a resetting pulse of tube 5—10. Tube 5—40 was previously in its normal condition and does not take part in either the 9th or 10th impulses. The resetting pulse which occurs on the 10th impulse and which is characterized by a change in condition in the double triode 5—80 which restores it to zero by rendering its right side conducting, produces a negative pulse along lead 9, which acts as a unit pulse into the next decade. In the case of Fig. 5 which happens to be the 4th and last decade shown, the tenth pulse represents a final pulse which is produced only after reaching the maximum count which can be produced in the four decades illustrated. With four decades as shown the maximum is 9999.

The first three decades operate in precisely the same manner as the 4th decade which has just been described. Thus, whenever the count of 9999 has been reached in the four decades the 10,000th impulse will produce a pulse in the first decade which will reset the first decade and pass a pulse on the second decade. This pulse in turn will reset the second and pass on a pulse to the third decade which in turn passes on a pulse to the 4th decade resetting the fourth decade and sending an impulse along conductor 9 to the left hand grid of double triode 8—30 of Fig. 8. The effect of this negative impulse on the left hand grid of double triode 8—30 is discussed below in conjunction with the description of Fig. 8.

The operation of a single decade unit as described above with regard to Fig. 5, may be summarized in tabular form as shown below illustrating the individual conditions of the several neon lamps for the respective impulses and further showing the occurrence of negative impulses. "X" indicates the occurrence of a negative impulse.

*Indicator*

| Impulse # | Negative pulse | 5-01 | Negative pulse | 5-02 | Negative pulse | 5-04 | Negative pulse | 5-08 | Negative pulse |
|---|---|---|---|---|---|---|---|---|---|
| 1 | X | On | | | | | | | | |
| 2 | X | | X | On | | | | | | |
| 3 | X | On | | | On | | | | | |
| 4 | X | | X | | X | On | | | | |
| 5 | X | On | | | | | On | | | |
| 6 | X | | X | On | | | On | | | |
| 7 | X | On | | | On | | On | | | |
| 8 | X | | X | | X | | X | On | | |
| 9 | X | On | | | | | | | On | |
| 10 | X | | ¹X | | | | (²) | | | X |

¹ Blocked.   ² Restoring pulse.

An examination of the table will show that it corresponds to the table of binary numbers above, and that the number of impulses counted in any decade can be ascertained by adding up the counts represented by the neon indicators which are showing. Thus in any particular decade a count of 7 would be indicated by lamps 5—01, 5—02 and 5—04.

It naturally follows that by translating any decimal digit into its binary equivalent and impressing these coefficients upon the four binary digits represented by the four tubes of the binary decade counter, any desired decimal digit may be preselected as a starting point for any decade. The difference between the preselected setting and 10 will be the number of impulses which can be received by the decade before automatic resetting occurs accompanying the tenth impulse.

Referring to Fig. 4, two groups of presetting switches are shown, designated A and B. Each switch has four sections operatively connected together by a common shaft. Each switch has 10 positions. Each position corresponds to one of the ten conditions which may be preset for its associated decade. Leads from each of the 8 grids of the 4 double triodes are brought to these preselecting switches. The 16 resistors indicated are primarily for the purpose of decoupling to prevent undesired interaction among the various grids. The preselecting switches are so arranged within each group that when a particular digit has been preselected the switch contacts will translate this preselection into its binary equivalent and will cause either the left or right side of each associated double triode, to be conducting or non-conducting as the case may be, in accordance with the binary equivalent of the decimal number preselected. Considering group A, which is shown at zero position, a positive impulse proceeding along conductor 12 will make the left hand side of all double triodes non-conducting and correspondingly the right hand side will become conducting. The right hand side will, therefore, receive a positive bias impulse and the left hand side of all triodes will receive no impulse. This connection is established on conductor 12, conductor 20a and conductor 20, with the right hand grid of tube 5—10, the positive pulse being of sufficient magnitude and duration to make certain that the right hand side of tube 5—10 will become conductive and correspondingly that the left hand side will be non-conductive. This is the zero condition for tube 5—10. Correspondingly, each of the other units of the preselecting switch of Group A will impress a positive impulse on the right hand grid of the remaining tubes 5—20; 5—40 and 5—80, respectively, via conductors 18, 16 and 14, respectively. Thus, with the setting of zero on switch A a positive impulse along conductor 12 will pre-establish a count of zero in its associated decade, and all neon indicators will be extinguished and all double triodes being set to their respective zero conditions.

With the switch in position 1 the positive pulse will cause tube 5—10 to be thrown to its actuated condition with its left hand side conducting and its right hand side non-conducting and the other three tubes will be either set or maintained as the case may be in their respective zero conditions.

The decimal to binary translation for other switch positions is accomplished by the connections shown in Fig. 4 which produce the required result and are as outlined in the table above. A corresponding arrangement is provided for the Group B preselecting switches. A positive impulse on conductor 12 will establish the preselected number determined by various positions of the four A group switches of the four decades and a positive pulse along conductor 23 will correspondingly establish the number determined by the various positions of the four Group B switches of the four decades. It will be noted that once the predetermined decimal number, translated into its binary form, has been inserted into the four decades, that the remaining number of impulses which can be transmitted into each decade will be the difference between predetermined digit setting and 10. In the case of four digits, it will be the difference between the preselected number and 10,000.

Referring to Fig. 8, there are three double triodes 8—10, 8—20 and 8—30. Associated with double triode 8—10 are two indicators 8—01 and 8—02. These indicators are connected in series with resistors 8—18 and 8—19 respectively.

The general arrangement of tube 8—10 is similar to that of the double triodes of Fig. 5, providing two conditions of stability. Resistors 8—11, 8—12, 8—13, associated with its left side and joining to the common resistor 8—14 and corresponding group of resistors 8—15, 8—17, 8—18, associated with its right side together with capacitors 8—12C and 8—17C.

Upon receipt of a final impulse corresponding to registration of the number 10,000 in the four decades, or to the number 10 in the 4th or thousands digit, a negative impulse will travel along lead 9 and into the left hand grid of double triode 8—30. This impulse will reduce the plate current on the left hand side of tube 8—30, making its cathode suddenly less positive. This change in cathode potential produces a negative pulse of greater power than that of the input which will proceed along the conductor 31 and through capacitor 8—01C to the ungrounded side of resistor 8—14. This negative impulse will cause double triode 8—10 to shift its condition of equilibrium from left to right or from right to left as the case may be. In the case of tube 8—10, there is no zero condition. Conductivity of one side corresponds to operative counting with respect to the preset switches of Group A of Fig. 4 and the other side corresponds to the Group B switches. Upon changing its condition of equilibrium, and assuming that the left side becomes non-conducting, a positive impulse will proceed from the left hand plate of tube 8—10 along conductor 32, capacitor 8—25C to the junction of resistors 8—21 and 8—22. Neon indicator 8—01 will then glow.

This positive impulse will momentarily increase or tend to increase the conductivity of the left side of double triode 8—20. Simultaneously there will be a negative pulse which will flow along conductor 83 and through capacitor 8—26C to the junction between resistors 8—23 and 8—24, causing the right side of double triode 8—20 to become less conducting.

The left anode of 8—20 is connected to conductor 33 and the right anode to conductor 34 which may be traced through the upper left hand corner of Fig. 9 to Fig. 6. The left side of the triode 8—20 which became more conducting, will endeavor to draw more plate current through conductor 33 but this will be prevented by the self-inductance of reactor 6—02. The right side, which received a negative impulse and became less conducting, will momentarily greatly reduce its plate current and the self-inductance of reactor 6—01 will tend to maintain constant current in its winding and will force this former plate current suddenly through capacitor 6—03 and into conductor 12, where it produces a positive pulse in all of the various sections of all four of the Group A switches of the four decade units, thus presetting the combinations determined by the various positions of the respective Group A switches associated with the four decades. Correspondingly, the next negative impulse along conductor 9 which will occur upon reaching the 10,000th unit, will shift the condition of stability of tube 8—10 to render its left side conducting and the ultimate positive impulse produced by reactor 6—02 will be distributed to the four presetting switches of Group B.

The right side of tube 8—30 is connected as an ordinary triode, its grid and cathode potentials being the same as those of the left side of tube 8—10. This condition is effected by conductor 35 joining the grids and conductor 36 joining the cathodes.

When the left side of 8—10 is conducting during the B count the right side of 8—30 will likewise be conducting. The right anode of 8—30 is connected via conductor 38, the windings 9—05 and 9—06 of relay 9—01 and resistor 9—11 to the anode supply conductor 300 in Fig. 9. When the right side of tube 8—30 is conducting, during the B count, relay windings 9—05 and 9—06 will be energized causing movable contact 9—04 to engage stationary contact 9—03. During the A count which starts from the initial preset number determined by the positions of the group A switches, relay 9—01 is deenergized and movable contact 9—04 engages stationary contact 9—02. This switch arrangement may be utilized to control external devices of any desired type by means of relays or other control apparatus. Capacitors 9—12 to 9—13 are bridged across the contacts of relay 9—01 to reduce sparking and prolong contact life.

The tube 8—10 may be set to either A count or B count as desired by momentarily deenergizing its corresponding cathode circuit, to render one side of the tube non-conductive. Both cathodes are normally connected through conductors 36 and 37 to the common cathode return conductor 150 in Fig. 9.

Momentary operation of switch 9—14 will open its contacts deenergizing conductor 36 and rendering the left side of tube 8—10 non-conductive, establishing a condition corresponding to the A count. Similarly, momentary operation of switch 9—15 will deenergize conductor 37 and establish tube 8—10 in condition for the B count. This shift in the tube 8—10 will produce corresponding presetting impulses through the action of tube 8—20 and the reactors 6—01 and 6—02.

Additional manual setting means are provided by the switches 6—05 and 6—06 of Fig. 6. With the switch blades 6—07 and 6—08 thrown to their left hand positions, closure of switch 6—05 will allow anode supply voltage from conductor 300 to flow through resistor 6—09 and conductor 38 to ground through resistor 6—11. This creates a positive impulse in conductor 39 which is passed through capacitor 6—03 to establish the preset number corresponding to the various positions of the Group A switches. Correspondingly, the operation of switch 6—06 will place a positive potential across the resistor 6—12, which impulse will be transmitted through capacitor 6—04 and conductor 23, to the Group B switches. In order to prevent actuation of tube 8—10, a shunting circuit is first established around the cathode biasing resistor 8—26 of the left side of tube 8—30, so that any pulse produced in the course of the resetting operation will not interfere with the operation of the system. This shunting circuit is completed to ground through conductor 41 which may be traced through Fig. 9 and capacitor 8—27 to the left cathode of tube 8—30. Normally, capacitor 8—27 is grounded through resistor 9—16 and ground lead 42 which is grounded in Fig. 8. With switch 6—07, 6—08 in the automatic position, that is thrown to the right, each time the maximum count is reached starting from the preset number determined by one group of switches, the preset number of the other group will be immediately introduced into the four decades and the next counting impulse will proceed from that point. The introduction of the next count will likewise be preceded by a change in the condition of high speed relay 9—01. In this way, any desired mechanism can be operated for any predetermined number of impulses in one condition and at the end of that number of impulses, can be operated in a different condition for a different predetermined number of impulses. Naturally, a lesser number of decades may be used where a smaller number of units may be counted and, accordingly, a larger number of decades may be used where greater numbers are involved.

Fig. 7 shows the power supply for the system comprising a power input plug 7—01, a rectifier 7—10 and two power transformers 7—02 and 7—03. A fuse 7—04 is provided for protection against overloads and a switch 7—05 permits control of the power supply. A winding 7—06 provides current to heat the filament of rectifier tube 7—10 and a high voltage winding 7—07 supplies the anodes of rectifier 7—10. Windings 7—08 and 7—09 supply various heaters in the system together with winding 7—11 of transformer 7—02. The high voltage output passes through filter choke 7—12 to the anode supply lead 300, the ripple being reduced by filter condensers 7—13 and 7—14. The center taps of all the heater supply windings 7—11, 7—08, 7—09 are connected to the common cathode return conductor 150 in order to minimize potential differences between the heaters and the cathodes of the various tubes. These cathodes are returned to ground through the adjustable resistor 7—15 which is so adjusted that the potential difference from lead 150 to ground will be approximately one half that of the anode supply. It has been found convenient in commercial practice to make the anode supply approximately 300 volts, and the common cathode potential approximately 150 volts.

Fig. 10 shows a single decade arrangement which is the same as the decade described above for Fig. 5, arranged with a single presetting switch 10—51. Neon discharge devices 10—52 to 10—59 inclusive, are provided to furnish additional decoupling between the various grids, the setting pulse being sufficiently strong to exceed the breakdown voltage of any one of the several neon tubes but not strong enough to pass through two tubes in series. The device is reset to zero by momentarily opening switch 10—61 which disconnects all the left hand cathodes rendering their left sides non-conducting restoring the tubes to their respective zero conditions. Any preset count can be inserted in the decade by sending a strong positive pulse along conductor 43.

Figs. 11 to 16 inclusive show the various arrangement for resetting an individual double triode to its zero condition and for instroducing a preset impulse to produce the actuated condition. The operation of each of these figures is the same as that described for Figure 5 and differs only in the various provisions for predetermining the condition of the tube, that is whether it is to be in its zero condition or its actuated condition. It is also to be noted that the neon indicator is shown associated with the left side and hence the tube is in its zero condition when the left side is conducting.

Referring to Fig. 11 a pair of diodes 11—01, 11—02 are provided and arranged to pass a momentary positive pulse through either diode to the corresponding grid. A positive pulse applied through switch 11—03 will make the right side of tube 11—10 conductive, thus resetting the the tube to zero.

Referring to Fig. 12, the arrangements are the same as for Fig. 11 except that the diodes 11—01 and 11—02 have been omitted.

In Fig. 13, momentarily opening switch 13—01, will render the left side non-conducting to produce the actuated condition. Momentarily opening switch 13—02, will render the right side non-conducting, corresponding to the zero condition.

Figure 14:
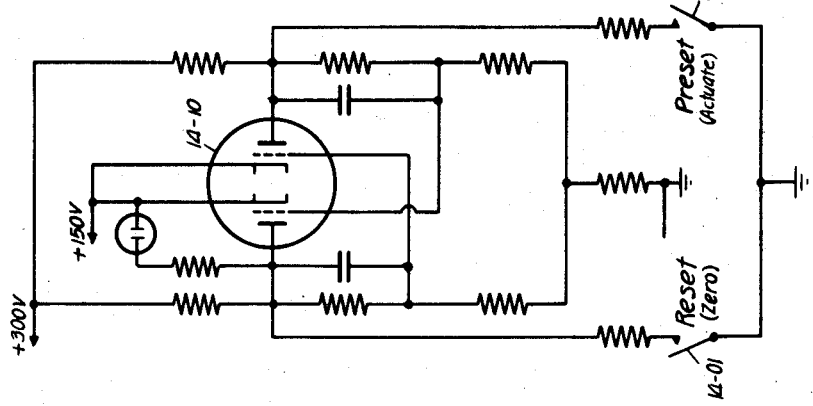

Referring to Fig. 14, momentary closure of switch 14—01 will make the right side of tube 14—10 non-conductive, by momentarily dropping the right grid considerably below its cathode potential. Similarly, momentary closure of switch 14—02 will make the left side non-conductive corresponding to the actuated condition.

Figure 15:
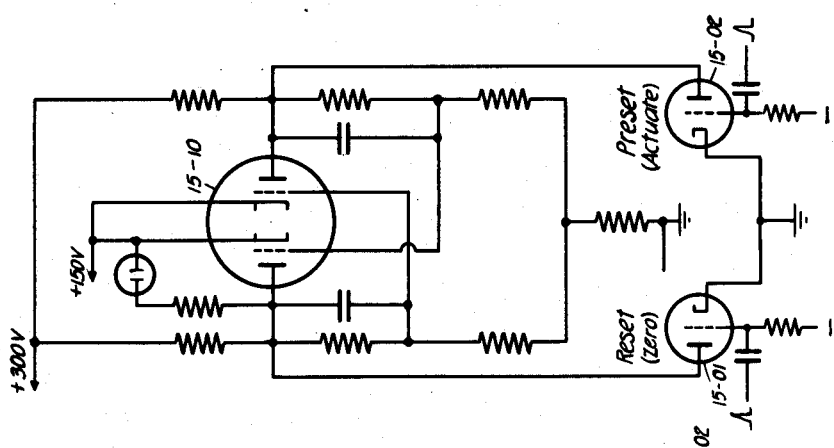

In Fig. 15, a positive pulse received by either of the triodes 15—01 or 15—02 will produce a momentary conductive condition in the particular triode producing a condition equivalent to momentary closing of either of the switches 14—01 or 14—02 of Fig. 14.

Figure 16:
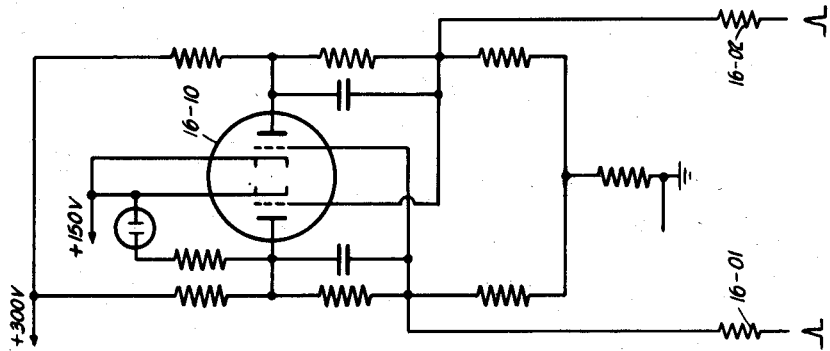

In Fig. 16, the pulses are applied directly through resistors 16—01 and 16—02, depending upon whether these pulses are positive or negative, actuating or resetting to zero will be produced. This type of operation has been described in conjunction with Figs. 2 to 9 and particularly Fig. 4 which utilize positive pulses and Fig. 10 which utilizes negative pulses.

A counting device of the type disclosed, finds numerous applications in industrial processes. This counter has been used with outstanding success in the manufacture of slide fasteners. Because the maximum counting rate at which this device is capable of operating is in excess of 1,000 units per second, no difficulty is experienced in counting objects at any rate at which present day high speed machinery may be sucessfully operated. By adjustment of the presetting devices, the number of elements to be incorporated in a slide fastener can be accurately determined and likewise the number of blank spaces which will intervene before the next group of elements is applied to the slide fastener. In changing from one type of fastener to another, a simple adjustment of the switches will arrange the machine to produce the new length.

Similarly, in the packaging of pills or other small objects, where the unit cost is extremely low, a counter of this type operating at high speed will produce an accurately filled package without any necessity for making an allowance in excess of the desired number. Such an allowance is customary where ratio weighing is used as a means of approximating an exact count.

The two groups of presetting switches, A and B, together with the high speed switching relay 9—01 permit the automatic operation of a product flow diverting mechanism such as a chute. This operation occurs in accordance with the predetermined count, allowing the operator to remove a full container and replace it by an empty one while the other container is being filled.

By obtaining the required negative counting impulses from a photo-electric system, the counting speed is limited as a practical matter only by the rate at which the objects can be made to pass in a single file to produce consecutive interruptions of the photo-electric light beam, and the operating time of the automatic control mechanism which functions upon reaching the predetermined count.

If the input, instead of being derived from objects to be counted, is obtained from an accurate frequency standard, such as a crystal oscillator, the counting device becomes a preset interval timer. If a 1,000 cycle frequency standard is utilized, the device will respond to the nearest millisecond. This permits very accurate timing of small intervals, the only limitation on accuracy being the inherent precision of the frequency standard and the action of the counter giving no indication of any time interval shorter than a complete cycle of the frequency standard.

I have described what I believe to be the best embodiments of my invention. I do not wish, however, to be confined to the embodiments shown, but what I desire to cover by Letters Patent is set forth in the appended claims.

I claim:

1. In a high speed predetermined electronic binary counter having a maximum counting capacity, a plurality of individually energizable groups of pre-setting and decimally indicating binary number translating means, each group comprising means for separately selecting an initial decimally indicated binary number from which counting is to commence, restoring means actuated upon exceeding the maximum counting capacity of said counter, and disposed to energize one group of pre-setting means to establish substantially instantaneously in said counter the initial number selected in the energized group of pre-setting means, and selective switching means responsive to each operation of said restoring means disposed to select consecutively and in rotation one of said groups of pre-setting means and connect said group for energization by said restoring means.

2. A counter as in claim 1 further comprising electrically actuable means responsive to the restoring means arranged to produce a control effect.

3. In a high speed predetermined electronic binary counter, two individually energizable groups of pre-setting and decimally indicating binary number translating means, each group comprising means for separately and independently selecting an initial decimally indicated binary number from which counting is to commence, restoring means actuated upon reaching a count determined by one of said groups of pre-setting means and disposed to energize the other of said groups of pre-setting means to establish substantially instantaneously in the counter a condition corresponding to a binary number determined by said last-named other group, and electrically actuable means responsive to each actuation of said restoring means disposed to produce alternately two distinct control effects.

4. In a high speed predetermined electronic binary counter having a maximum counting capacity, two individually energizable groups of pre-setting and decimally indicating binary number translating means, each group comprising means for separately and independently selecting an initial decimally indicated binary number from which counting is to commence and which number may be rendered effective by energization of the group, restoring means actuated upon exceeding said maximum counting capacity, and selective switching means responsive to each actuation of said restoring means and disposed to connect each of the two groups of pre-setting means alternately for energization upon actuation of the restoring means.

5. A counter as in claim 4 further comprising electrically actuable means operatively connected to the selective switching means and arranged to produce a control effect external to the counter.

6. A counter as in claim 4 in which the selective switching means comprises a trigger circuit having two conditions of stability, each condition being established alternately by successive actuations of the restoring means.

7. In a predetermined counter, the combination of, a plurality of cascaded electronic trigger circuits comprising trigger pairs for counting electrical impulses, a plurality of branch circuits connected to predetermined points in said trigger circuits for setting a count into said trigger circuits, a multi-point selector switch for inter-connecting predetermined combinations of said branch circuits for predeterming said count to be set into said trigger circuits and a time delay circuit for applying a pulse to said switch for resetting said count into said trigger circuits.

8. In a predetermined counter, the combination of, a plurality of cascaded electronic trigger circuits comprising trigger pairs and forming an electrical pulse responsive counter, a plurality of branch circuits connected to predetermined pulse responsive points in said trigger circuits for setting a count into counter, and circuit closers for applying a pulse to a predetermined combination of said branch circuits for setting a predetermined count into said counter.

9. In a predetermined counter, the combination of, a counter comprising four cascaded electronic trigger stages, circuits interconnecting predetermined stages of said counter to fill said counter and to provide an output pulse from said counter upon receipt of the tenth input pulse, branch circuits connected to pulse responsive points in said stages for inserting a presetting count into said counter and a coupling circuit including a time delay device and multiple circuit closers connected between the last of said trigger stages and said branch circuits to insert said presetting count into said counter in responsise to said output pulse.

10. In a multiple predetermined electronic counter, the combination of, at least one impulse responsive binary electronic counting device modified to count according to the decimal system, at least two independently adjustable presetting means for pre-inserting predetermined fixed counts into said counting device and an electronic switch responsive to said counting device for applying a presetting impulse to at least one of said presetting means upon the completion of each full count of said counting device.

11. In a multiple predetermined electronic pulse counting device the combination of an electronic counter having an inherent maximum count capacity, at least two independently adjustable devices for adjusting the registration in said counter of a number representing the difference between said maximum count and the number to be counted, and means for alternately activating said devices to preset the counter in response to successively filling the counter.

JOHN T. POTTER.

REFERENCES CITED

The following references are of record in the file of this patent:

UNITED STATES PATENTS

| Number | Name | Date |
|---|---|---|
| 2,158,285 | Koch | May 16, 1939 |
| 2,272,070 | Reeves | Feb. 3, 1942 |
| 2,346,869 | Poole | Apr. 18, 1944 |
| 2,375,413 | Guenther | May 8, 1945 |
| 2,394,924 | Luhn | Feb. 12, 1946 |
| 2,398,150 | Mumma et al. | Apr. 9, 1946 |
| 2,398,771 | Compton | Apr. 23, 1946 |
| 2,401,621 | Desch et al. | June 4, 1946 |
| 2,403,873 | Mumma | July 9, 1946 |
| 2,410,156 | Flory | Oct. 29, 1946 |
| 2,536,955 | Palmer et al. | Jan. 2, 1951 |

FOREIGN PATENTS

| Number | Country | Date |
|---|---|---|
| 609,502 | Great Britain | Oct. 1, 1948 |

OTHER REFERENCES

"Preset Interval Timer," Electronic Industries, July 1945, pp. 97–99, 134, 138, 142, 146 and 150.